A. H. SHIELDS.
HOSE COUPLING.
APPLICATION FILED FEB. 17, 1912.
1,069,038.
Patented July 29, 1913.
3 SHEETS—SHEET 2.
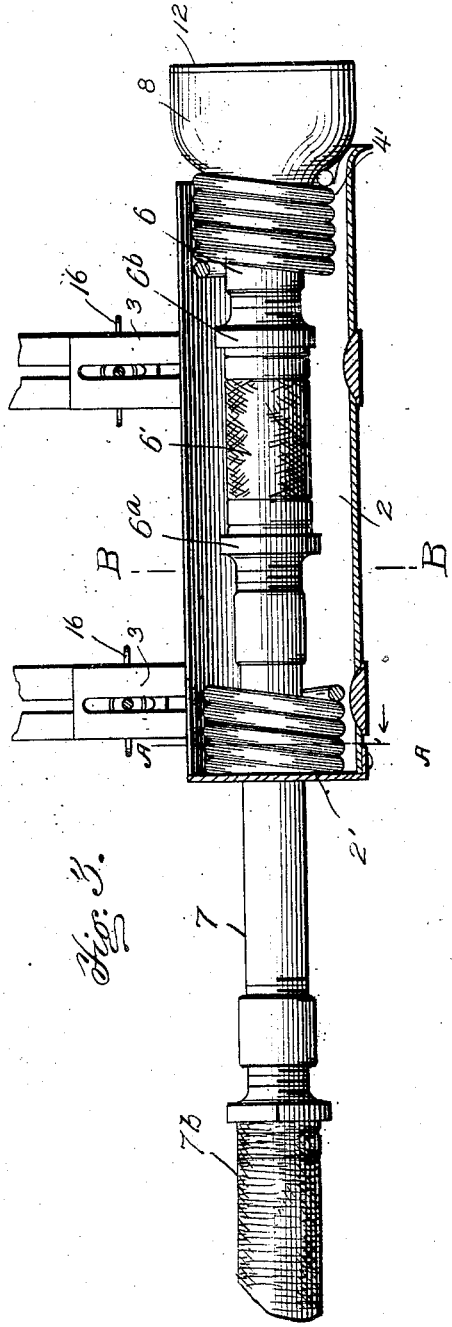
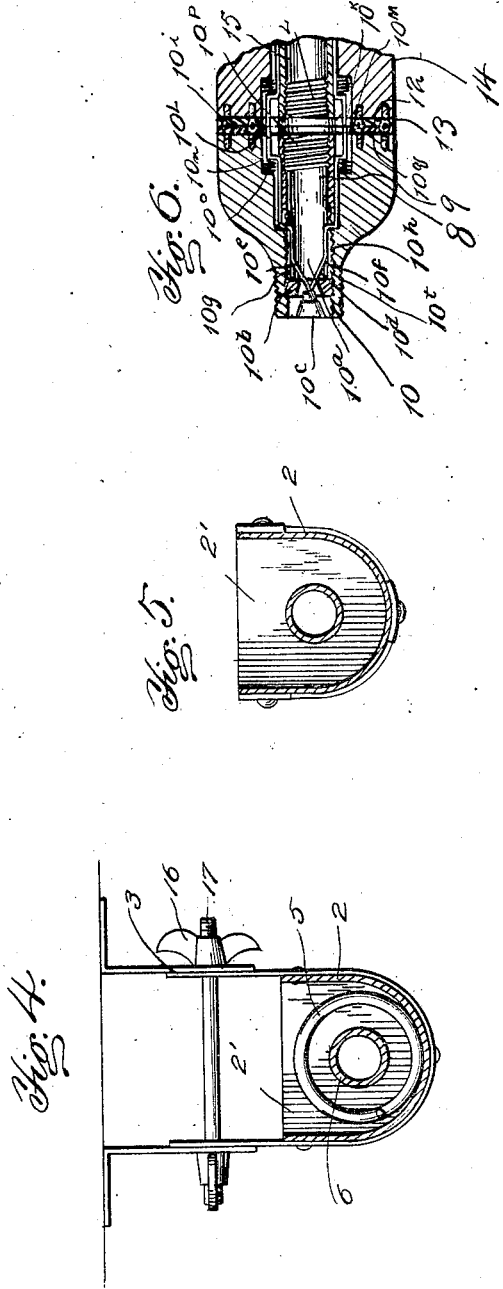
Witnesses
R. S. Trogner.
R. Kisluik.
Inventor
A. H. Shields
By
Geo. Wedderburn
Attorney A. H. SHIELDS.
HOSE COUPLING.
APPLICATION FILED FEB. 17, 1912.
1,069,038.
Patented July 29, 1913.
3 SHEETS—SHEET 3.
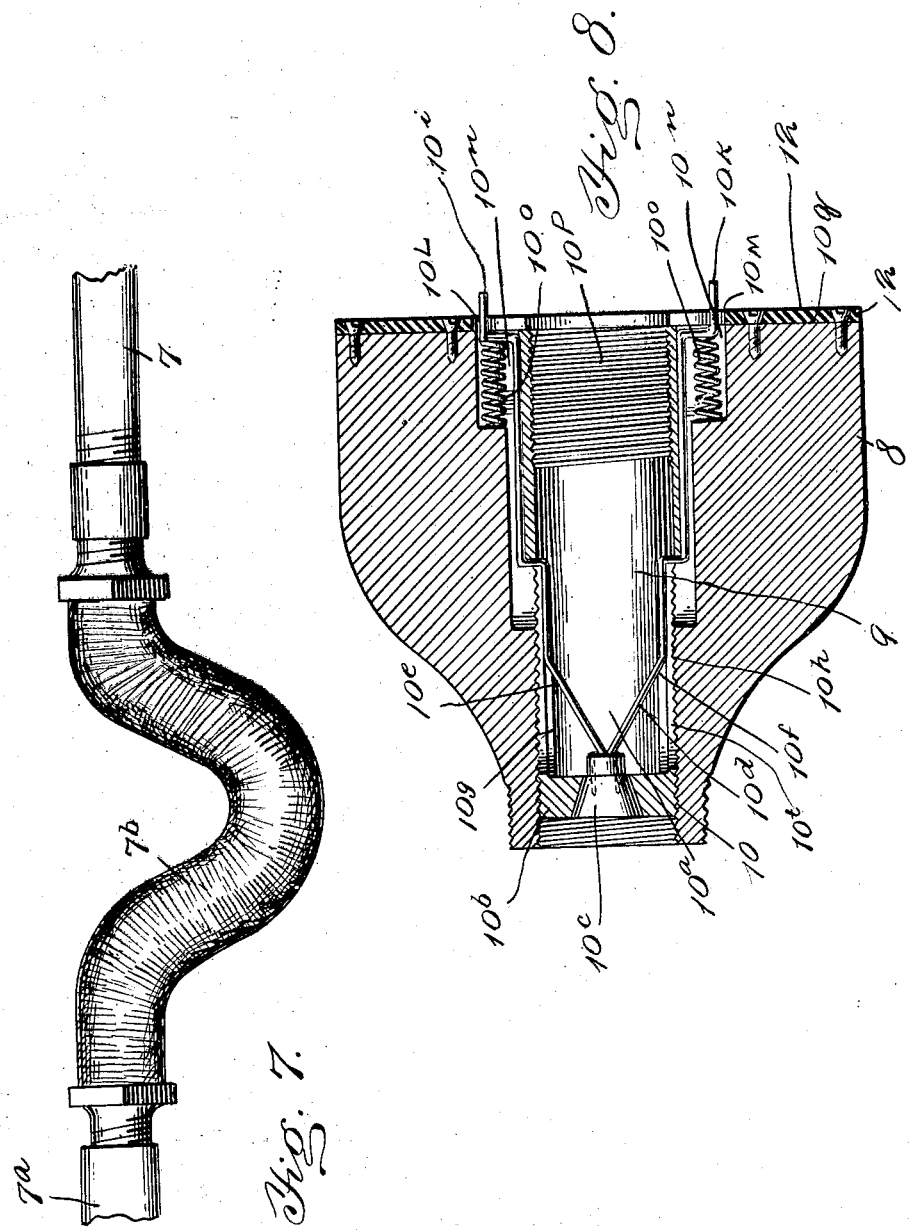
WITNESSES
INVENTOR
H. H. Shields
Attorney

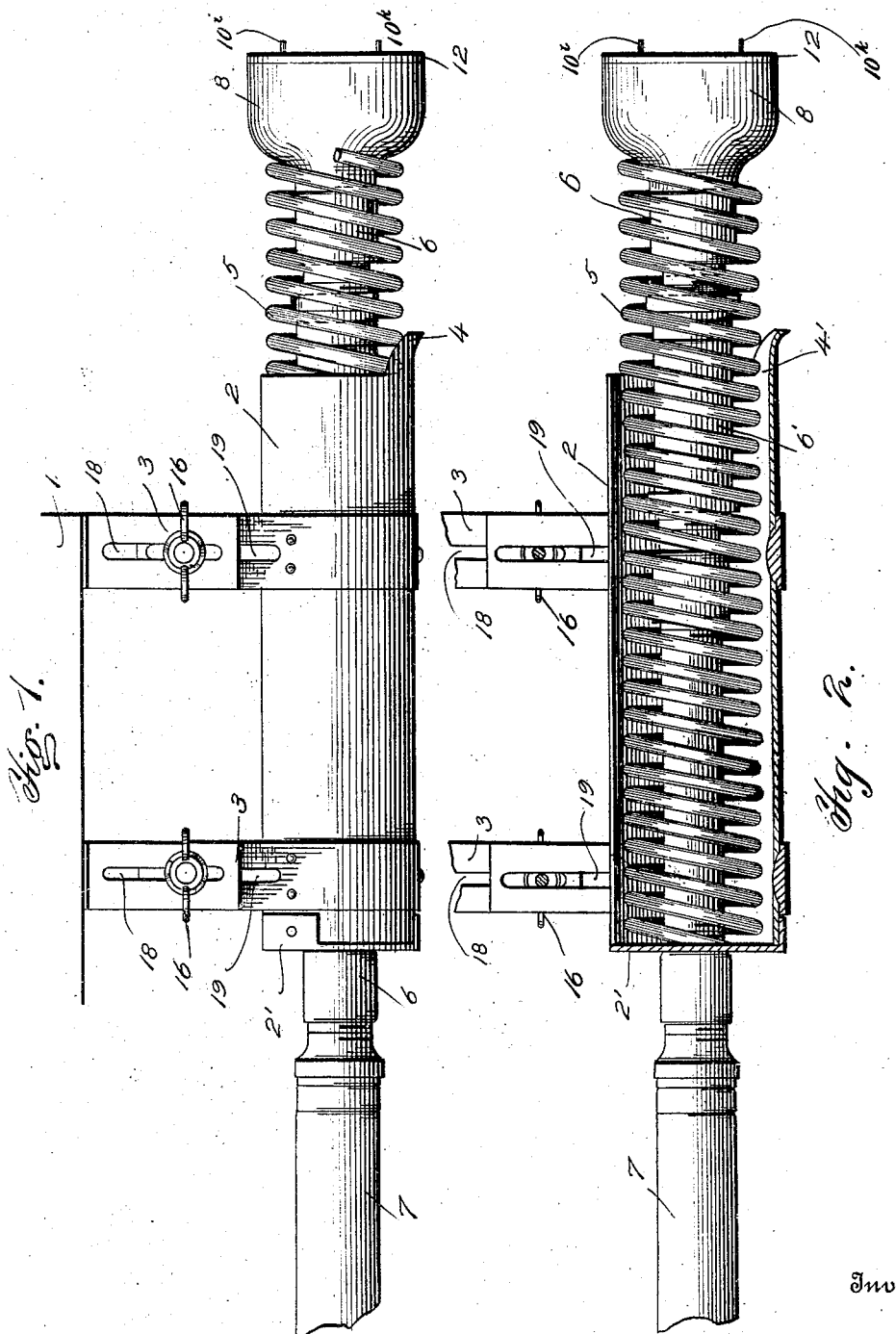

UNITED STATES PATENT OFFICE.

ALBERT H. SHIELDS, OF COLUMBIA, TENNESSEE.

HOSE-COUPLING.

1,069,038.  Specification of Letters Patent.  Patented July 29, 1913.

Application filed February 17, 1912. Serial No. 678,259.

*To all whom it may concern:*

Be it known that I, ALBERT H. SHIELDS, a citizen of the United States, residing at Columbia, in the county of Maury and State of Tennessee, have invented certain new and useful Improvements in Hose-Couplings, of which the following is a specification.

This invention relates to improvements in couplings for air hose and the like used in connection with air lines for steam and electric railways, etc., and the object of the invention is to provide automatic means whereby the air line of one car may be automatically coupled with the air line of another car when said cars are coupled together.

Another object of the invention is to provide an automatic pipe coupling having means whereby a valve is opened when said line is coupled.

With the above and other objects in view I have invented the device illustrated in the accompanying drawings in which, Figure 1 is an elevational view of one section of a coupling member, Fig. 2 is a view similar to Fig. 1, the supporting pan being taken in longitudinal section, Fig. 3 is a view similar to Fig. 2 showing a spring member compressed and partially broken away, Fig. 4 is a sectional view taken on line A—A of Fig. 3, Fig. 5 is a sectional view taken on line B—B of Fig. 3, the spring member and supporting brackets being removed, Fig. 6 is a detail longitudinal sectional view of a coupling member shown in coupled position, Fig. 7 is a section of air hose having a flexible portion, and Fig. 8 is an enlarged detail longitudinal section of a coupling head.

Like reference numerals indicate like parts throughout the specification and in the several drawings in which—

1 indicates the draw head or other suitable portion of a car to which is secured a coupling supporting pan 2 by means of the adjustable brackets 3. The member 2 is U-shaped as will be seen clearly upon reference to Figs. 4 and 5 and is provided with a lip 4 on its outer end 4' which is adapted to guide the spring 5, which encompasses and normally projects the pipe 6 to which is secured the coupling head 8, said pipe 6 is slidable in said member 2 and through an opening in the end wall 2' thereof and is coupled to the pipe line 7, which is connected to the main pipe line 7ª by means of a flexible connecting hose 7ᵇ. Within the pan 2, a section of flexible hose 6' is introduced between pipe 6 and pipe 7 by means of couplings 6ª and 6ᵇ. This flexible hose is provided in order that the device may accommodate itself to curves and bends encountered when in operation upon a railroad train.

Secured to the free end of the slidable pipe 6 is a coupling head 8 having an opening or passage-way 9 therethrough, said passage-way having a reduced internally screw-threaded portion 10 into which is seated the tubular member 10ª having a reduced externally screw-threaded portion 10ᵗ which screws into said portion 10 whereby the portion 10ª is held in said opening 9. The inner end of the member 10ᵗ is closed by a member 10ᵇ having a conical opening in which is seated the valve member 10ᶜ said valve being operable by a member 10ᵈ to which it is fixed. The member 10ᵈ is provided with arms 10ᵉ and 10ᶠ which project through slots 10ᵍ and 10ʰ in the member 10ᵗ, shown in full lines in Fig. 8. These arms have offset portions 10ⁱ and 10ᵏ which are adapted to project through the openings 10ᴸ and 10ᵐ. The passage 9 is provided with an enlarged portion 10ⁿ into which the right-angular portions 10ᵘ and 10ᵛ of the arm ends 10ʷ and 10ˣ extend and in which are seated the springs 10ᵒ which abut said right-angular portions, whereby said valve operating member is adapted to hold said valve normally within its seat. The extreme ends 10ⁱ and 10ᵏ of said arms project through said openings 10ᴸ and 10ᵐ in the face 10ᑫ of said coupling and the gasket 12 whereby they may be engaged by an opposing head and shoved in to operate said valve 10ᶜ. The tubular member 10ª is provided with a screw-threaded outer portion 10ᵖ which is adapted to have screwed thereinto an ordinary pipe coupling in case it is desired to connect this coupling with those couplings commonly in use at the present time. The face 10ᑫ of the head 8 is provided with a gasket 12 of soft rubber or other suitable material. The pipe 6 is held normally in the extended position shown in Figs. 1 and 2 and when cars are coupled together the gasket 12 of the head 8 is adapted to abut the gasket 13 on the coupling head 14, the spring 5 being of sufficient tension to force the gaskets hard against one another and securely hold them together while the cars remain coupled. The flexible portion 7$^b$ of the pipe 7 permitting sufficient play in order to prevent the heads from being separated from one another by any movement of the cars. Thus the passage 9 is connected with the passage 15 in the opposing member, whereby air or other fluid will pass freely from one hose to another. When the heads come together the opposing head forces back the valve operating member 10$^d$ causing the valve 10$^c$ to be shoved out of its seat, thus permitting free passage of fluid through the pipe lines. The pan 2 may be adjusted vertically by means of the thumb nuts 16 and screws 17 working in slots 18 and 19 of the adjustable members 3.

Having now described my invention, what I claim and desire to secure by Letters Patent is:

1. A device of the kind described comprising a hollow coupler head, an end wall removably secured in one end of said head, a plug valve seated in said end wall, a tube secured in said head and having one end closed by said valve, an end wall arranged at the opposite end of said head and having an opening communicating with said pipe, a two-armed member secured to said valve and arranged to project outside of said second-named end wall, said valve being closed when said arms project, said members, when forced out of projecting position causing said valve to open, means for guiding said arms, and means for automatically moving said arms to projecting position.

2. In combination a hollow coupler head, a tube disposed in said head and having a reduced portion screw-threaded into one end thereof, an end wall in said head closing one end of said pipe, a plug valve seated in said end wall, a two-armed member which is secured at one end to said valve, said arms having stepped portions slidably disposed respectively inside the reduced portion and over the main body of said pipe, an end wall secured at the opposite end of said head and having an opening registering with said pipe, a rightangular portion being formed upon each arm, each rightangular portion arranged to project through said second-named end wall, said hollow head being formed with an enlarged opening to form a shoulder, and two springs each bearing against said shoulder and the rightangular portion of one arm to cause said valve to be closed.

3. A device as described consisting of a pipe having an enlarged head with an opening extending therethrough, a closure for said opening, means for operating said closure, said means located in said opening, and projecting therefrom whereby it may be operated, said closure consisting of a valve and said means consisting of parallel arms connected thereto, a tubular member in said opening having slots therein through which said arms project.

4. A device as described consisting of a pipe having an enlarged head with an opening extending therethrough, a closure for said opening, means for operating said closure, said means located in said opening, and projecting therefrom whereby it may be operated, said closure consisting of a valve and said means consisting of parallel arms connected thereto, a tubular member in said opening having slots therein through which said arms project, said arms having shoulders thereon, springs abutting said shoulders whereby said opening will be held normally closed.

5. A device as described consisting of a pipe having an enlarged head with an opening extending therethrough, a closure for said opening, means for operating said closure, said means located in said opening, and projecting therefrom whereby it may be operated, said closure, consisting of a valve and said means consisting of parallel arms connected thereto, a tubular member in said opening having slots therein through which said arms project, said arms having shoulders thereon, springs abutting said shoulders whereby said opening will be normally closed, and means whereby said valve may be held open.

6. A device as described consisting of a pipe having an enlarged head with an opening extending therethrough, a closure for said opening, means for operating said closure, said means located in said opening, and projecting therefrom whereby it may be operated, said closure consisting of a valve and said means consisting of parallel arms connected thereto, a tubular member in said opening having slots therein through which said arms project, said arms having shoulders thereon, springs abutting said shoulders whereby said opening will be normally closed, and means whereby said valve may be held open, said means consisting of head constructed similar to said first head.

7. A device as described consisting of a pipe having an enlarged head with an opening extending therethrough, a closure for said opening, means for operating said closure, said means located in said opening and projecting therefrom whereby it may be operated, said closure consisting of a valve and said means consisting of parallel arms connected thereto, a tubular member in said opening having slots therein through which said arms project, said arms having shoulders thereon, springs abutting said shoulders whereby said opening will be normally closed, means whereby said valve may be held open, said means consisting of a head constructed similar to the said first head, a semi-cylindrical member for supporting said pipe.

8. A device as described consisting of a pipe having an enlarged head with an opening extending therethrough, a closure for said opening, means for operating said closure, said means located in said opening and projecting therefrom whereby it may be operated, said closure consisting of a valve and said means consisting of parallel arms connected thereto, a tubular member in said opening having slots therein through which said slots project, said arms having shoulders thereon, springs abutting said shoulders whereby said opening will be normally closed, means whereby said valve may be held open, said means consisting of a head constructed similar to the said first head, a semi-cylindrical member for supporting said pipe, adjustable brackets for supporting said member.

9. A device as described consisting of a pipe having an enlarged head with an opening extending therethrough, a closure for said opening, means for operating said closure, said means located in said opening and projecting therefrom whereby it may be operated, said closure consisting of a valve and said means consisting of parallel arms connected thereto, a tubular member in said opening having slots therein through which said arms project, said arms having shoulders thereon, springs abutting said shoulders whereby said opening will be normally closed, means whereby said valve may be held open, said means consisting of a head constructed similar to the said first head, a semi-cylindrical member for supporting said pipe, adjustable brackets for supporting said member, said member having a lip at its outer end.

10. A device as described consisting of a pipe having an enlarged head with an opening extending therethrough, a closure for said opening, means for operating said closure, said means located in said opening and projecting therefrom whereby it may be operated, said closure consisting of a valve and said means consisting of parallel arms connected thereto, a tubular member in said opening having slots therein through which said arms project, said arms having shoulders thereon, springs abutting said shoulders whereby said opening will be normally closed, means whereby said valve may be held open, said means consisting of a head constructed similar to the said first head, a semi-cylindrical member for supporting said pipe, adjustable brackets for supporting said member, said member having a lip at its outer end, a spring around said pipe guided by said end.

11. A device as described consisting of a pipe having an enlarged head with an opening extending therethrough, a closure for said opening, means for operating said closure, said means located in said opening and projecting therefrom whereby it may be operated, said closure consisting of a valve and said means consisting of parallel arms connected thereto, a tubular member in said opening having slots therein through which said arms project, said arms having shoulders thereon, springs abutting said shoulders whereby said opening will be normally closed, means whereby said valve may be held open, said means consisting of a head constructed similar to the said first head, a semi-cylindrical member for supporting said pipe, adjustable brackets for supporting said member, said member having a lip at its outer end, a spring around said pipe guided by said end, said member having an opening in its inner end through which said pipe is slidable.

12. In a hose coupling, a slidable pipe, a semicylindrical member for supporting the same, adjustable brackets supporting said member, said member having a lip at its outer end, a spring around said pipe guided by said end, said semi-cylindrical support having an opening in its inner end through which said pipe is slidable, said pipe having a coupling head at its outer end.

13. In a hose coupling, a slidable pipe, a semi-cylindrical member for supporting the same, adjustable brackets supporting said member, said member having a lip at its outer end, a spring around said pipe guided by said end, said semi-cylindrical support having an opening in its inner end through which said pipe is slidable, said pipe having a coupling head at its outer end, and a flexible connection between said head and the pipe.

In testimony whereof I affix my signature in presence of two witnesses.

ALBERT H. SHIELDS.

Witnesses:
J. A. SANDERS,
SIMS LATTA.

Copies of this patent may be obtained for five cents each, by addressing the "Commissioner of Patents, Washington, D. C."